Aug. 4, 1931.    W. LÜHR    1,817,753
SYSTEM FOR TRANSMITTING MOTION.
Filed June 8, 1923

Inventor:
Wilhelm Lühr,
by Alexander F. [Lentz?]
His Attorney.

Patented Aug. 4, 1931

1,817,753

UNITED STATES PATENT OFFICE

WILHELM LÜHR, OF HALLE, GERMANY, ASSIGNOR TO GENERAL ELECTRIC COMPANY, A CORPORATION OF NEW YORK

SYSTEM FOR TRANSMITTING MOTION

Application filed June 8, 1923, Serial No. 644,219, and in Germany June 21, 1922.

The question of the distant regulation of electrical machines and the distant reading of electrical instruments, to which my invention relates, is increasing in importance more and more as electrical installations become larger and wider in range. Thus it is often desirable, for example, to have a long-distance actuating system between a central station and its sub-stations, which system can be used for distant control of apparatus or machines as well as for the automatic distant transmission of any sort of magnitudes from station to station.

My invention has for its object the simplest possible and most reliable system of connections for such installations. I make use of the feature that a cathode-ray tube acting as an oscillator transmits the oscillations produced by it to a receiving station. In accordance with my invention, a cathode-ray tube is utilized for varying the deflection of measuring instruments in such manner that the various acts of regulation are obtained by varying the sending frequency of the tube.

Figure 1:
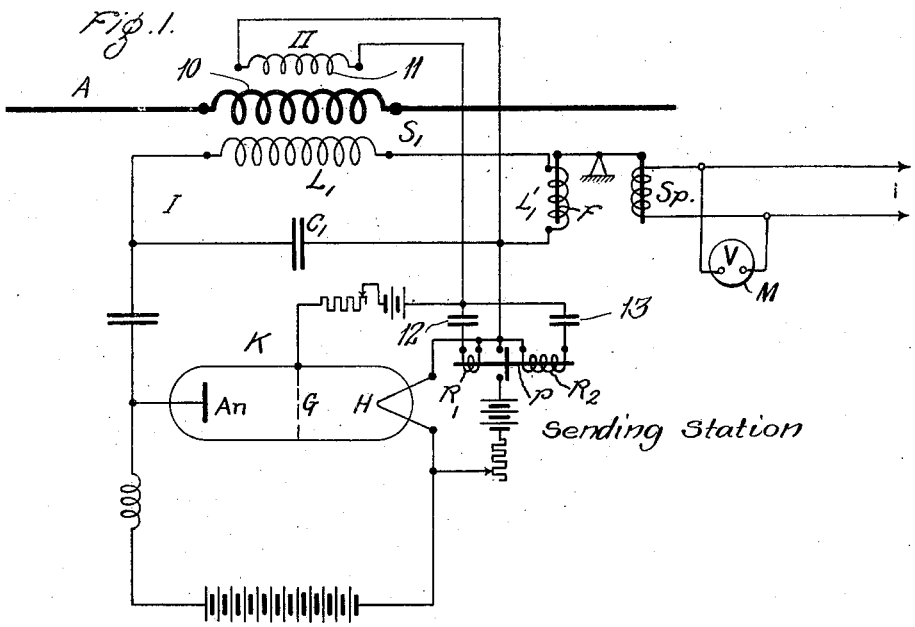
Figure 2:
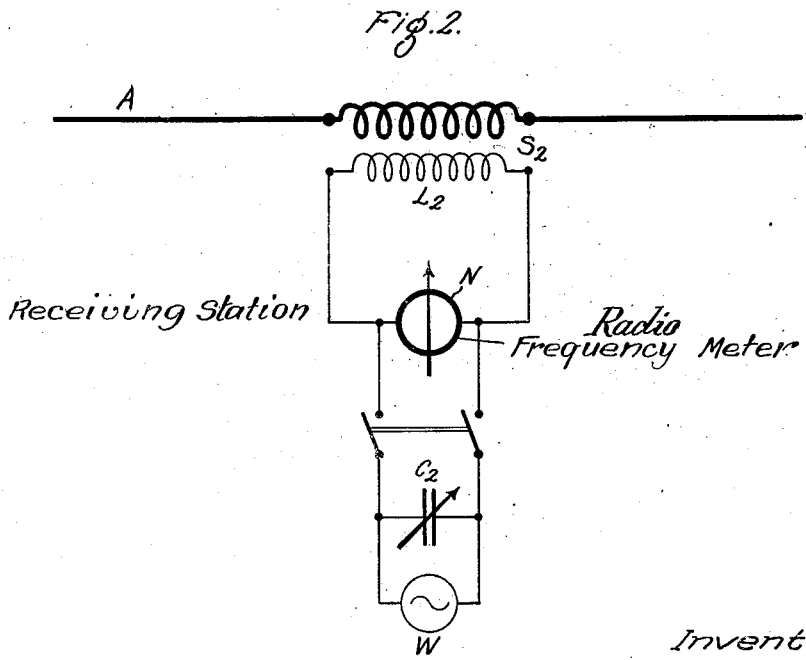

For an explanation of the principles of the invention, one illustrative embodiment is shown in the drawing, in which Fig. 1 is a diagrammatic representation of the sending station; while Fig. 2 is a diagrammatic representation of the receiving station.

Referring to the drawings, in the embodiment of my invention shown, the measurement values of an instrument, for example, a voltmeter, are to be transmitted automatically from one station to another. K is the cathode-ray tube, the intensifying or plate circuit of which is indicated by I and the exciter or feed back circuit by II. The intensifying circuit of the tube is coupled with the line A and with the exciting circuit by the coil arrangement $S_1$, so that the tube excites itself. As shown the coil arrangement $S_1$ consists of three inductively associated coils, a coil $L_1$ having one terminal connected to the plate or anode $An$, and its other terminal connected to the grid G so as to be included in the plate circuit of the tube K, a coil 10 included in the line A, and a feed back coil 11 which is connected in the plate circuit of the tube K in series with the coil $L_1$. The frequency of oscillation of the intensifying circuit depends on the magnitude of its capacity and inductance. $C_1$ is a suitable fixed capacity, $L_1$ a constant inductance and $L^1_1$ a variable inductance, the magnitude of which depends on the position of the iron core F situated in it. The position of the iron core F is regulated by an electromagnet, whose coil $S_D$ is connected with the measurement circuit to be transmitted, together with a measuring instrument M, which may be a voltmeter. As thus connected, to each measurement magnitude will correspond a certain frequency which may be transformed through $S_1$ to the line A, which may be connected in the form of a long-distance line or antennæ. The oscillations are transmitted in this way to $S_2$ at the receiving station (Fig. 2), and from there to any desired indicating instrument, which is shown here as an ordinary wave length or radio frequency meter N, calibrated with instrument M to the measurement magnitude in question. In this manner the frequency meter N is regulated from the sending station to reproduce the movements of the instrument M so that the indications of the instrument M may be read at the receiving station on the frequency meter.

The variation of the variable inductance $L^1_1$ under the control of the measurement magnitude to be transmitted is here given only by way of example, and the remaining possible connections will not be discussed. Also by the variation of the capacity the same result may be secured. If the long-distance transmission is to be effected only temporarily, the tube and its heating circuit H may be connected in circuit and disconnected therefrom, from the receiving station, for example, by controlling a switch P in the heating circuit H by means of operating coils $R_1$ and $R_2$ connected respectively in two resonant circuits, each of which is tuned to a frequency different from the other which does not coincide with the frequencies corresponding to the indications of the instrument M. These tuned circuits for the coils $R_1$ and $R_2$ are included, for example, in the exciting circuit II of the tube. Obviously the coils $R_1$ and $R_2$ could be included in any suitably tuned circuit associated with the line A. As shown, the two coils $R_1$ and $R_2$ are connected for convenience in parallel with each other across the feed back coil 11 in series respectively with condensers 12 and 13 by means of which their circuits are suitably tuned. If from $S_2$ to $S_1$ through A are sent oscillations of a frequency to which the circuit of one or the other of coils $R_1$ and $R_2$ is tuned, for example, through any desired source of alternating current W and the resonance circuit $C_2$, $L_2$, the coil corresponding to the frequency of the oscillations sent will be energized and the heating-circuit switch P will be correspondingly actuated to open or closed position as the case may be.

What I claim as new and desire to secure by Letters Patent of the United States, is,—

1. A system for transmitting motion comprising a cathode tube connected to operate as an oscillator, means for varrying the frequency of the oscillations of said tube, receiving means responsive to the frequency of said oscillations, a switch in the heating circuit of said tube, operating coils for actuating said switch to open and closed positions respectively, said coils being connected in resonant circuits, and remotely disposed means for producing oscillations of different frequencies to selectively energize said coils so as to connect and disconnect the heating circuit of said tube as desired.

2. A system for transmitting motion comprising a sending station, a receiving station remote therefrom, a cathode tube connected to operate as an oscillator in said sending station, means for varying the frequency of the oscillations of said tube, receiving means in said receiving station responsive to the frequency of said oscillations, a switch in the heating circuit of said tube, operating coils for actuating said switch to open and closed positions, respectively, said coils being connected in circuits tuned to frequencies different from the frequencies of the oscillations of said tube, the circuits of said coils being associated with a circuit of said tube, and means in said receiving station for producing oscillations of different frequencies to selectively energize said coils so as to connect and disconnect the heating circuit of said tube as desired.

3. A system for transmitting motion comprising a cathode tube connected to operate as an oscillator, a measurement circuit, means for automatically varying the inductance of a circuit of said tube so as to vary the frequency of the oscillations of said tube in accordance with the magnitude of an electrical condition in said measurement circuit, and remotely situated receiving means responsive to the frequency of said oscillations.

4. A system for transmitting motion comprising a sending station, a receiving station remote therefrom, a cathode tube connected to operate as an oscillator in said sending station, a measurement circuit, means associated with said measurement circuit for automatically varying the inductance of a circuit of said tube so as to vary the frequency of the oscillations of said tube in accordance with the magnitude of an electrical condition in said measurement circuit, and indicating means in said receiving station responsive to the frequency of said oscillations.

In witness whereof, I have hereunto set my hand this 19 day of May, 1923.

WILHELM LÜHR.